Nov. 6, 1923.

J. T. POKORNY 1,473,044

MOLDING MACHINE

Filed April 22, 1920    5 Sheets-Sheet 1

INVENTOR
James T. Pokorny
BY
Hardway Cathu
ATTORNEYS

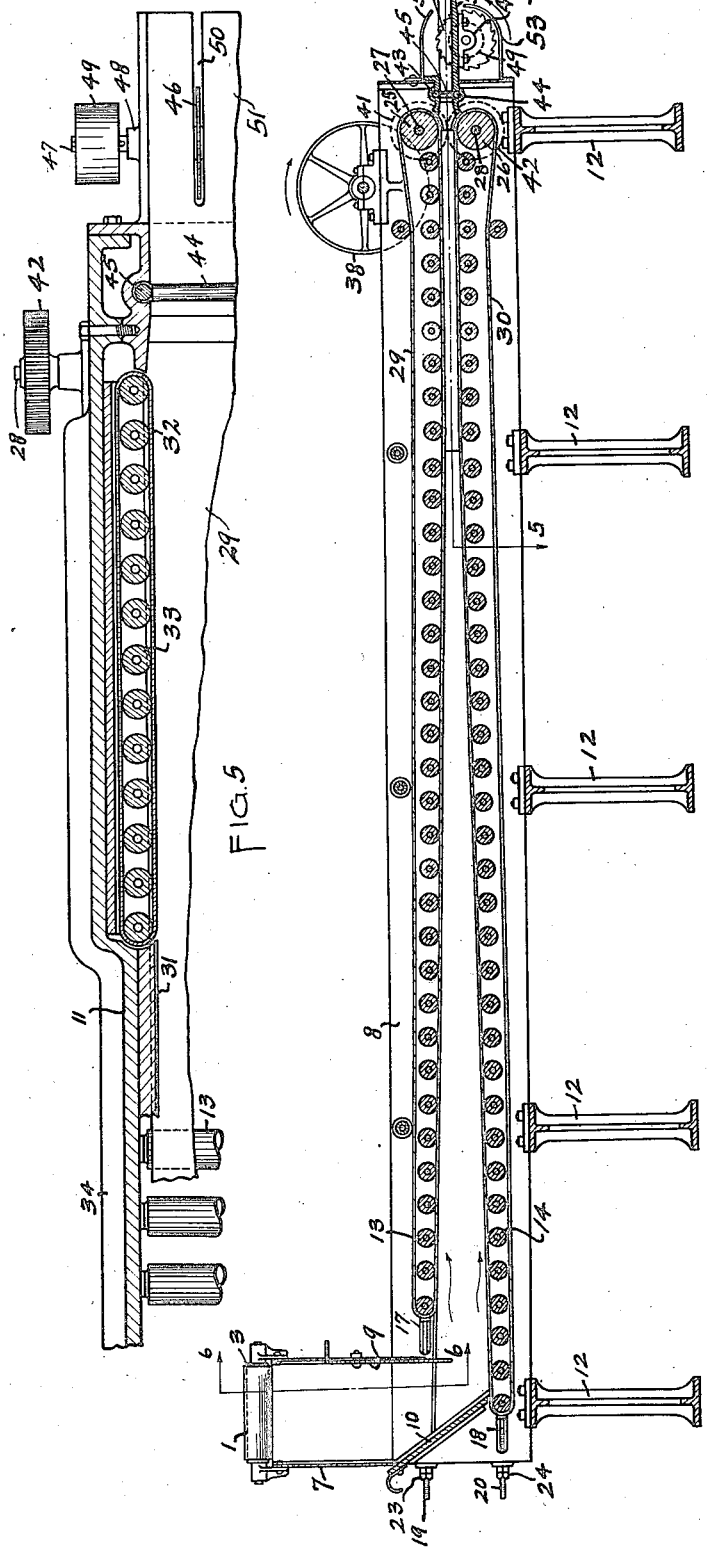

Nov. 6, 1923.
J. T. POKORNY
MOLDING MACHINE
Filed April 22, 1920
1,473,044
5 Sheets-Sheet 5
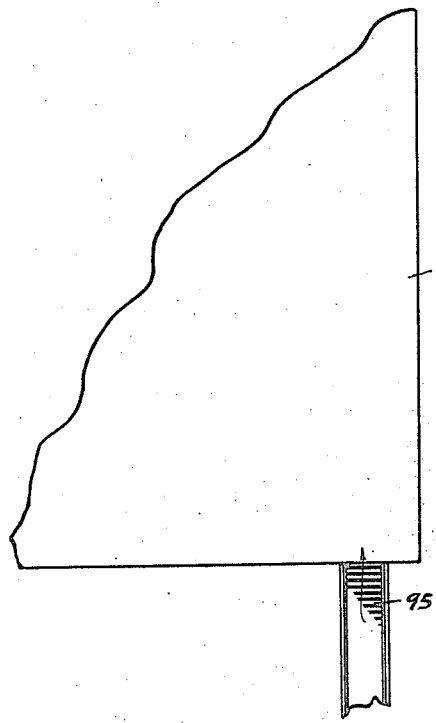
FIG. 11.
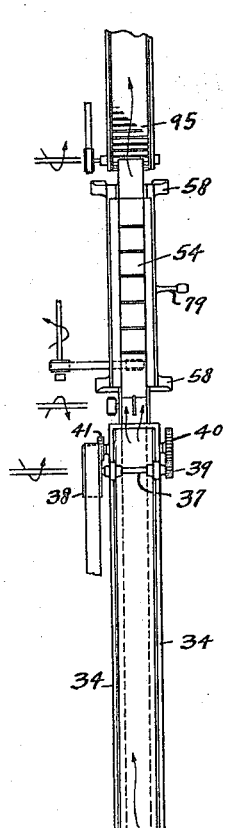
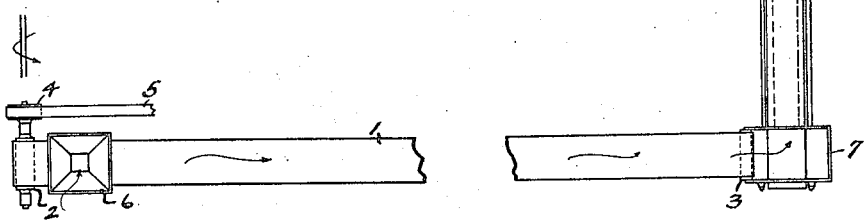
FIG. 10.
INVENTOR
James T. Pokorny.
BY
Hardway & Cathey
ATTORNEYS Patented Nov. 6, 1923.                                                          1,473,044

UNITED STATES PATENT OFFICE.

JAMES T. POKORNY, OF CEDAR BAYOU, TEXAS, ASSIGNOR TO A. T. EDDINGSTON, OF PORT ARTHUR, JEFFERSON COUNTY, TEXAS.

MOLDING MACHINE.

Application filed April 22, 1920.  Serial No. 375,836.

*To all whom it may concern:*

Be it known that I, JAMES T. POKORNY, citizen of the United States, residing at Cedar Bayou, in the county of Harris and State of Texas, have invented certain new and useful Improvements in a Molding Machine, of which the following is a specification.

This invention relates to new and useful improvements in a molding machine and has particular relation to a machine of the character described which has been specially constructed for the purpose of molding brick. One object of the invention is to provide a machine of the character described, of a construction adapted to receive the clay, or other material to be formed, and to form the same into bodies of the required size and contour which are by said machine then delivered to the kiln to be burned.

Another object of the invention is to provide a molding machine of the character described which is of a construction adapted to receive the clay or other material and to compress the same into a compact and even mass which is then by said machine separated into individual brick of uniform contour.

A further feature of the invention resides in the provision of a machine of the character described which is of simple construction, and which in the main is automatic in operation and which consequently simplifies the process of molding brick with the result that brick may be produced more cheaply and easily than with the methods now in common use.

Figure 1:
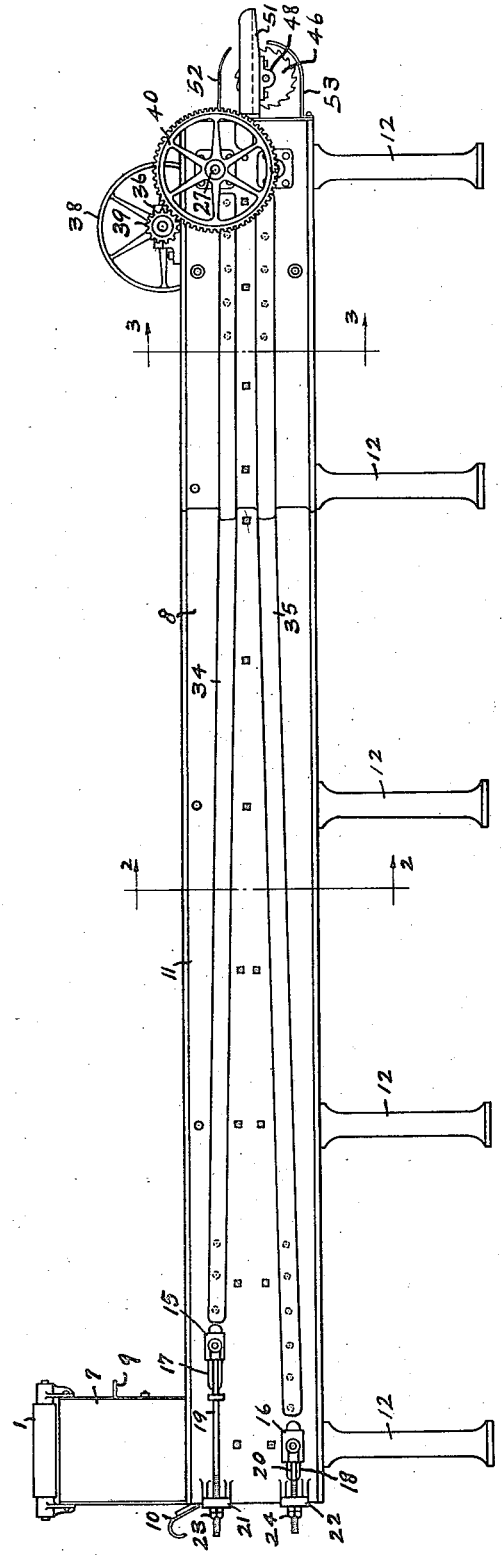
Figure 3:
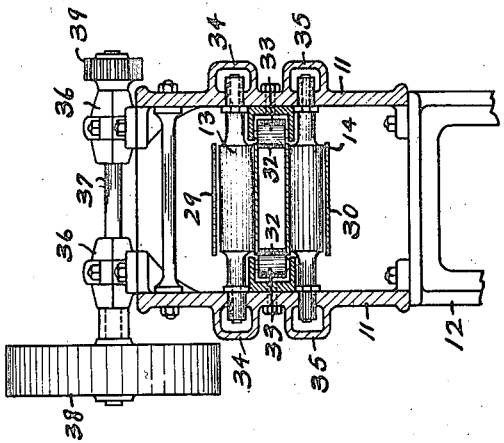
Figure 2:
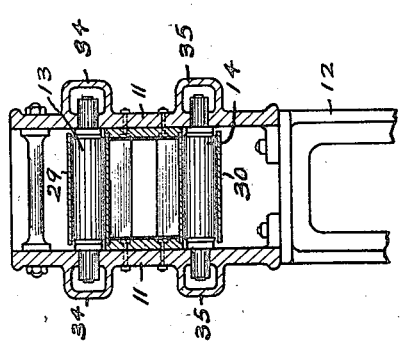
Figure 7:
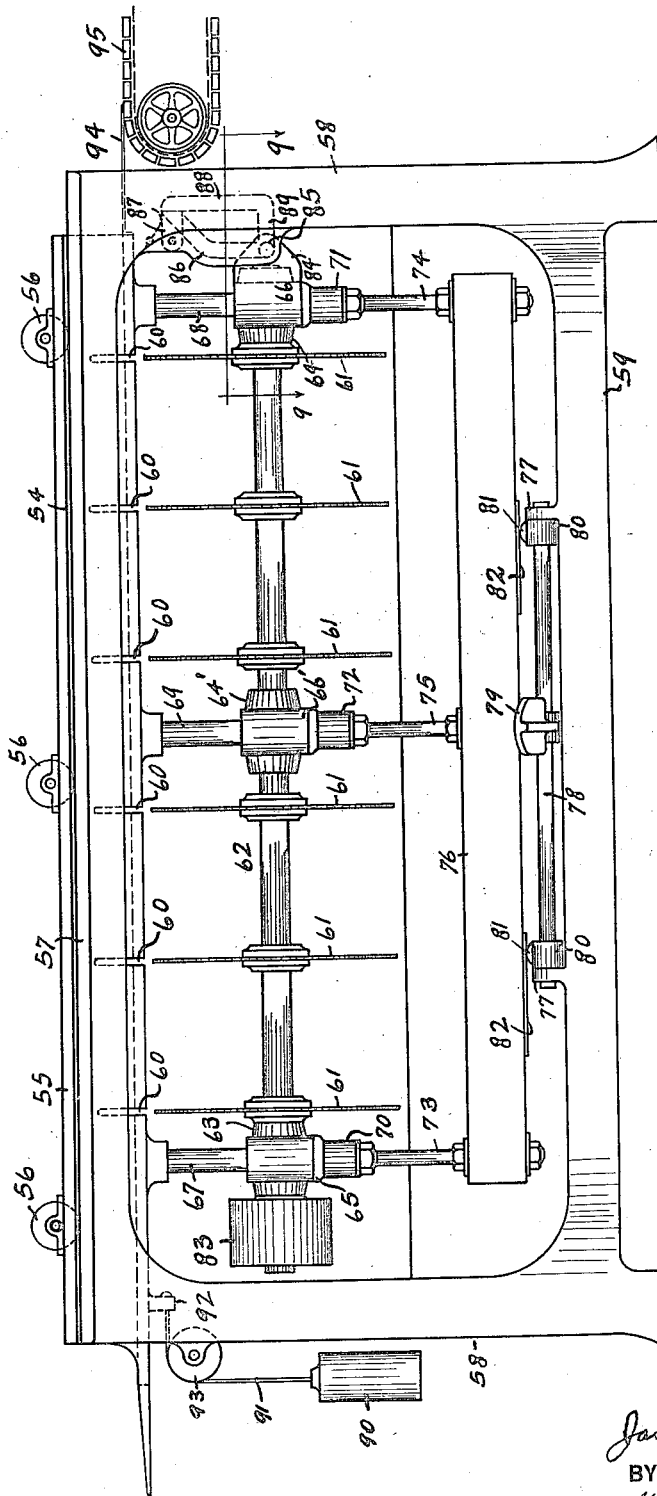
Figure 8:
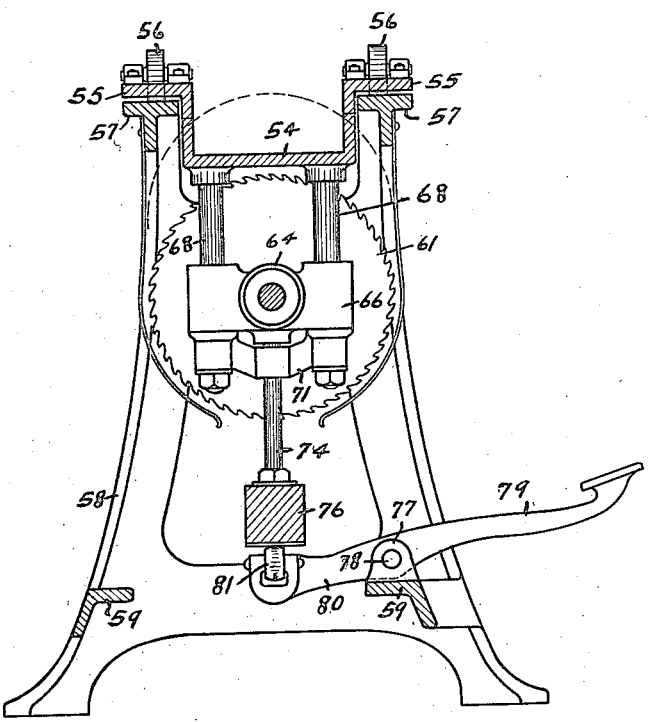
Figure 9:
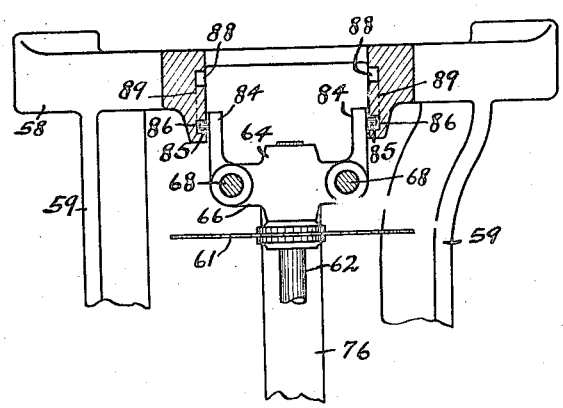

With the above and other objects in view the invention has particular relation to certain novel features of construction, operation and arrangement of parts, an example of which is given in this specification and illustrated in the accompanying drawings wherein:

Figure 1 is a side elevation of the molding machine,

Figure 2 is an enlarged transverse sectional view, taken on the line 2—2 of Figure 1, Figure 3 is a transverse sectional view taken on the line 3—3 of Figure 1, Figure 4 is a longitudinal, vertical, sectional view, Figure 5 is a fragmentary, horizontal, sectional view, taken on the line 5—5 of Figure 4, Figure 6 is a fragmentary, vertical, sectional view, taken on the line 6—6 of Figure 4, Figure 7 is an enlarged side elevation of the saw frame showing the separating saws mounted therein, Figure 8 is a vertical, sectional view thereof, Figure 9 is a fragmentary, horizontal, sectional view thereof, taken on the line 9, 9 of Figure 7, Figure 10 shows a diagrammatic plan view of the complete device showing the connecting parts and, Figure 11 shows a fragmentary plan view of the kiln, showing the conveyor by means of which the brick are delivered into said kiln from the brick forming machine.

Referring now more particularly to the drawings wherein like numerals of reference designate similar parts in each of the figures, the numeral 1 refers to a conveyor which operates over the end rollers 2 and 3. The shaft of the roller 2 has the pulley 4 fixed thereon which is driven through the belt 5. Mounted above the outer end of the conveyor 1 there is a hopper 6 into which the clay to be molded is delivered. The conveyor 1 carries said clay and delivers it into the hopper 7 which is mounted at the inlet end of the long molding chamber 8. The inlet of the material into the molding chamber is controlled by a vertically movable gate 9 and the outer end of said chamber is closed by means of a slidable gate 10 which may be removed for the purpose of gaining access into said chamber. The molding chamber is formed with suitable sides 11, 11 which are mounted on supporting legs 12. Two series of transverse rollers are mounted in this chamber, the upper series being composed of the rollers 13 and the lower series being composed of the rollers 14. The end rollers of the respective series at the feed end of the chamber have their shafts rotatably mounted in suitable bearing blocks as 15 and 16 which are slidably mounted in slots 17 and 18 cut through the sides 17 and adjusting rods 19 and 20 are attached at their inner ends to these blocks and their outer ends protrude through the respective bearings carried by the outer ends of the respective members 11, and are threaded to receive adjusting nuts 23 and 24 respectively. At the opposite end of the molding chamber are the transverse rollers 25 and 26 which are fixed upon the respective shafts 27 and 28 and these rollers 25 and 26 drive the respective endless aprons 29 and 30 which travel around the respective series of rollers 13 and 14. The slack of these aprons may be regulated by the adjusting nuts 23 and 24 in an obvious manner.

The rollers of each series are so arranged that the belts or aprons 29 and 30 will converge toward each other from the feed end about three fourths of the way to the discharge end of the molding chamber and the sides of said chamber opposite the converging parts of the belts are preferably lined with sheet metal, 31, such as copper. From the end of said lining 31 extending to the discharge end of the molding chamber there are the lateral traveling belts 32, 32 which travel around the respective series of side rollers 33, 33.

The rollers 13 and 14 of the upper and lower series are fixed on shafts whose ends rotate in suitable bearings in the sides 11, 11 of the molding chamber and the respective ends of said shafts are enclosed by means of long hoods 34 and 35 which are provided to contain oil whereby the shaft bearings are lubricated.

Rotatably mounted in the bearings 36, 36 carried by the discharge end of the molding chamber there is a transverse shaft 37, fixed upon one end of which there is a pulley 38 projected to receive a belt through which the mechanism described is driven. The other end of the shaft 37 has a spur gear 39 fixed thereon which is in mesh with a large gear wheel 40 which is fixed on the corresponding end of the shaft 27. The opposite end of this shaft 27 has the small gear wheel 41 fixed thereon which is in mesh with the corresponding gear wheel 42 which is fixed upon the corresponding end of the shaft 28. Through the mechanism just described the aprons 29 and 30 are driven in the directions indicated by the arrows in Figure 4.

The clay to be molded is delivered as described into the hopper 7 and the delivery thereof from said hopper into the molding chamber may be regulated by the sliding gate 9. The material is delivered on to the apron 30 and is thereby carried along between it and the cooperating apron 29 and is gradually compressed by reason of the fact that said aprons converge. The compressed bat thus formed is carried on between said aprons 29 and 30 and the side aprons 32, 32 and is forced out through the discharge end of the molding chamber. The discharge opening from said chamber has the upper and lower discharge rollers 43 and 44 and the aligned side rollers 45, 45 therethrough between which the bat is forced, said rollers being provided to smooth and give a uniform shape to the bat.

In front of said discharge opening there is a centrally located circular saw 46 which is fixed upon the transverse shaft 47 rotatable in suitable bearings 48. One end of the shaft 47 has a band wheel 49 fixed thereon through which the saw may be driven. This saw works through a lengthwise slot 50 cut through the delivery platform 51 and it is partially surrounded above by the hood 52 and beneath by the hood 53. The bat is cut in two, lengthwise, by means of the saw 46 and passes thence into the channel 54, which is just wide enough to receive it. This channel has the lateral flanges 55, 55 which carry the rollers 56 which are rotatably mounted thereon. These rollers operate through aligned slots in the flanges 55 and travel on the tracks 57, 57 into which the upper part of the saw frame is formed. This frame is supported by suitable end legs 58 which are connected at their upper ends by means of the tracks 57 and at their lower ends by means of the bars 59, 59. The bottom of the channel 54 has transverse slots 60 cut therethrough and spaced apart through which the circular saws 61 are designed to play. These saws are provided to cut the compressed material into brick of required length and the slots 60 and the saws 61 are spaced apart so as to give the required length to the brick. The saws 61 are fixed upon a lengthwise shaft 62 which rotates in the end bearings 63 and 64 and the central bearing 64' carried by the respective yokes 65, 66, and 66'. The yokes 65, 66 and 66' are vertically movable upon the bearing rods 67, 67; 68, 68 and 69, 69, which are fixed to and depend from the respective ends and the center of the channel 54. Secured to the lower ends of the respective pairs of bearing rods 67, 68 and 69 are the bearings 70, 71 and 72 through which the lift rods 73, 74, and 75 respectively operate. The upper ends of these rods are secured to the respective yokes 65, 66 and 66' and their lower ends are secured to a left bar 76.

The front cross brace 59 has the spaced bearings 77, 77 formed integrally therewith and which are provided to receive the respective ends of the shaft 78. There is a foot pedal 79 fixed to the center of this shaft and fixed to the respective ends of the shaft are the lift arms 80, 80 which extend inwardly underneath the lift bar 76 and whose inner ends have the rollers 81, 81 which operate against the bearing plates 82, 82 secured to the underside of said lift bar.

The saw shaft 62 has the pulley 83 fixed upon one end thereof over which a suitable belt operates to rotate said shaft and the saws carried thereby. When the foot pedal 79 is depressed it will operate through the arms 80 to elevate the lift bar 76 and the saws will be thereby projected up through the slots 60. These saws are rotating rapidly when elevated and will sever the bat into bricks of the required length. The bat will be slowly moving forward and consequently the saws must be permitted to move forwardly with it. To accomplish this the yoke 66 is provided with the projecting ears 84, 84 which carry the outwardly projecting studs 85, 85. When the saws are elevated these studs travel upwardly in the corresponding grooves 86, 86, provided in the legs 58 to receive them and, as shown in Figure 7 these grooves incline forwardly so that as the saws travel upwardly they will also be carried forwardly until the studs 85 pass the spring-gates 87 which drop down and block the grooves 86 as soon as the studs have passed. The foot pedal 79 is now released permitting the saws to descend and the studs 85 will travel downwardly along the grooves 88, 88 to the lower ends thereof. When said studs have reached the lower ends of said grooves 88 they will then pass along the connecting grooves 89 to their original position. This last mentioned movement is effected through the medium of a weight 90 which is attached to the lower end of the cable 91. The other end of this cable is secured to the lug 92 which depends from the channel 54 and the cable plays over a pulley 93 rotatably mounted on the adjacent leg 58. The channel 54 thus has a limited oscillating movement along the track 57 and the saws 61 travel back and forth with it while brick are being cut by them. The brick after cut are gradually forced by the oncoming bat across the delivery table 94 on to an endless belt 95 arranged to receive them and to convey them into the kiln 96.

What I claim is:

1. A device of the character described including a molding chamber, having an inlet opening at one end and an outlet opening at the other end, traveling conveyors spaced apart and arranged one above the other and movable from the inlet toward the outlet end of said chamber, side conveyors, one arranged on each side of the outlet end of the chamber between which the material is carried by said conveyors first mentioned.

2. A device of the character described including a molding chamber, having an inlet opening at one end and an outlet opening at the other end, a chute arranged at the outlet end of said chamber and provided with transverse slots, spaced apart, traveling conveyors within said chamber spaced apart and movable from inlet toward the outlet end thereof, said conveyors being provided to receive material from the inlet opening and to compress the same into a bat and discharge the same through the outlet opening along said chute, cutters aligned under the respective slots and a manual mechanism through which said cutters may be projected through the respective slots to sever the bat therein transversely.

3. A device of the character described including a molding chamber having an inlet opening at one end and an outlet opening at the other end, traveling conveyors within said chamber spaced apart and movable from the inlet end toward the outlet end and provided to receive material from the inlet opening and compress the same between them and deliver said compressed material through the outlet opening, an oscillating chute arranged at the outlet end of the chamber to receive the bat delivered through said outlet opening, said chute being provided with transverse slots, cutters aligned underneath the respective slots, said cutters being movable with said chute and a manual mechanism through which said cutters may be projected through and withdrawn from said slots.

4. A device of the character described including a molding chamber having an inlet opening at one end and an outlet opening at the other end, traveling aprons spaced apart and movable from the inlet end toward the outlet end and provided to receive material from the inlet opening and compress the same between them and deliver said compressed material through the outlet opening, a saw arranged in front of said outlet opening and provided to separate said material lengthwise as it is delivered through the outlet opening and vertically movable saws arranged in front of the outlet opening and provided to sever said material transversely.

5. A device of the character described including a molding chamber having an inlet opening at one end and an outlet opening at the other end, an upper and lower series of rollers fixed upon shafts whose ends project through bearings in the sides of said chamber, enclosed hoods carried by the sides of the chamber into which the outer ends of the respective shafts project, said hoods being provided to contain a lubricant whereby the shaft bearings are lubricated, and endless aprons operating over the respective series of rollers.

In testimony whereof I have signed my name to this specification in the presence of two subscribing witnesses.

JAMES T. POKORNY.

Witnesses:
W. A. CATHEY,
A. ALLEN.